(12) United States Patent
Ziegler

(10) Patent No.: US 9,146,717 B2
(45) Date of Patent: Sep. 29, 2015

(54) OPTIMIZING SOURCE CODE

(75) Inventor: Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 386 days.

(21) Appl. No.: 13/418,027

(22) Filed: Mar. 12, 2012

(65) Prior Publication Data

US 2013/0174118 A1 Jul. 4, 2013

Related U.S. Application Data

(60) Provisional application No. 61/581,379, filed on Dec. 29, 2011.

(51) Int. Cl.
*G06F 9/44* (2006.01)
*G06F 9/45* (2006.01)

(52) U.S. Cl.
CPC . *G06F 8/443* (2013.01); *G06F 8/30* (2013.01)

(58) Field of Classification Search
CPC .................................. G06F 8/443; G06F 8/30
USPC ......................................................... 717/106
See application file for complete search history.

(56) References Cited

U.S. PATENT DOCUMENTS

| | | | | |
|---|---|---|---|---|
| 2003/0097652 | A1* | 5/2003 | Roediger et al. | 717/160 |
| 2006/0236310 | A1* | 10/2006 | Domeika et al. | 717/140 |
| 2008/0092112 | A1* | 4/2008 | Jin et al. | 717/106 |
| 2009/0077360 | A1* | 3/2009 | Liu et al. | 712/233 |
| 2009/0113387 | A1* | 4/2009 | Ziegler | 717/109 |
| 2009/0228865 | A1* | 9/2009 | De Becdelievre et al. | 717/106 |
| 2014/0040858 | A1* | 2/2014 | Ivan et al. | 717/109 |

OTHER PUBLICATIONS

"Decision Table IF statements," from http://teaching.idallen.com/cst8110/97s/decision_table.html, last visited Feb. 27, 2012 (7 pages).*
Schumacher et al., "The Synthetic Approach to Decision Table Conversion", Communications of the ACM, vol. 19, No. 6, Jun. 1976, pp. 343-351, XP002691280.*
"Decision table," from http://en.wikipedia.org/wiki/Decision_table, last visited Feb. 27, 2012 (4 pages).
"A Real CCIDE Decision Table Generator Example," from http://ccide.sourceforge.net/example.shtml, last visited Feb. 27, 2012 (5 pages).
Notification of Extended European Search Report for EPO Application 12007773.0-1957 dated Feb. 13, 2013, 10 pages.
Udo W. Pooch, "Translation of Decision Tables", ACM Computing Surveys, vol. 6, No. 2, Jun. 1974, pp. 125-151, XP002691279.

(Continued)

*Primary Examiner* — Wei Zhen
*Assistant Examiner* — Mohammed Huda
(74) *Attorney, Agent, or Firm* — Fish & Richardson P.C.

(57) ABSTRACT

Techniques for optimizing code include methods, systems, and computer program products that implement operations including: identifying a decision table having values arranged in one or more cells in a row and column format, the values defining business rules; evaluating the decision table to generate one or more temporary tables, at least one temporary table including the values associated with particular positions of a string variable of undefined length; evaluating the one or more temporary tables to set the positions of the string variable based on comparisons of the values with inputs; and generating a portion of code defining the business rules based on the evaluation of the one or more temporary tables.

12 Claims, 7 Drawing Sheets

| | COLUMN | VALUE | ROWS |
|---|---|---|---|
| 320a | FIELD 1 | =A | 1,2,3,4,... |
| 320b | FIELD 1 | =B | 5,6,... |
| 320c | FIELD 2 | TRUE | 1,3,5,... |
| 320d | FIELD 2 | FALSE | 2,4,6,... |
| 320e | FIELD 3 | 1..100 | 1,2,5,6,... |
| 320f | FIELD 3 | >100 | 3,4,... |
| 320g | RESULT FIELD 1 | 1 | 1,... |
| 320h | RESULT FIELD 1 | 2 | 2,... |
| | ... | | |

(56) References Cited

OTHER PUBLICATIONS

C.R. Muthukrishnan et al., "On the Conversion of Decision Tables to Computer Programs", Communications of the ACM, vol. 13, No. 6, Jun. 1970, pp. 347-351, XP002691281.

Solomon L. Pollack, Comment on the Conversion of Decision Tables to Computer Programs:, Communications of the ACM, vol. 14, No. 1, Jan. 1971, p. 52, XP002691282.

Solomon L. Pollack, "Conversion of Limited-Entry Decision Tables to Computer Programs", Communications of the ACM, vol. 8, No. 11, Nov. 1965, pp. 677-682, XP002691283.

Keith Shwayder, "Conversion of Limited-Entry Decision Tables to Computer Programs—A Proposed Modification to Pollack's Algorithm", Communications of the ACM, vol. 14, No. 2, Feb. 1971, pp. 69-73, XP0020691284.

H.W. Kirk, "Use of Decision Tables in Computer Programming", Communications of the ACM, vol. 8, No. 1, Jan. 1965, pp. 41-43, XP002691285.

P.J.H.King, "Conversions of Decision Tables to Computer Programs by Rule Mask Techniques", Communications of the ACM, vol. 9, No. 11, Nov. 1966, pp. 796-801, XP002691286.

Myers H.J., "Compiling Optimized Code from decision Tables", IBM Journal of Research and Development, International Business Machines Corporation, New York, NY, US, vol. 16, No. 5, Sep. 1, 1972, p. 489-503, XP008159677.

Communication from EPO re related Application No. 12 007 773.0-1957; dated Nov. 15, 2013; 8 pages.

Alfred V. Aho, et al. "Compilers, principles, techniques, and tools."; Chapter 10, Code Optimization; ISBN: 0-201-10088-6; Reprinted with corrections Mar. 1986; 16 pages.

\* cited by examiner

FIG. 2

| | FIELD 1 | FIELD 2 | FIELD 3 | ... | RESULT FIELD 1 | ... |
|---|---|---|---|---|---|---|
| 215a | =A | TRUE | 1..100 | | 1 | ... |
| 215b | =A | FALSE | 1..100 | | 2 | ... |
| 215c | =A | TRUE | >100 | | 3 | ... |
| 215d | =A | FALSE | >100 | | 4 | ... |
| 215e | =B | TRUE | 1..100 | | 5 | ... |
| 215f | =B | FALSE | 1..100 | | 6 | ... |
| | ... | | | | ... | ... |

FIG. 3A

| | COLUMN | VALUE | ROWS |
|---|---|---|---|
| 320a | FIELD 1 | =A | 1,2,3,4,... |
| 320b | FIELD 1 | =B | 5,6,... |
| 320c | FIELD 2 | TRUE | 1,3,5,... |
| 320d | FIELD 2 | FALSE | 2,4,6,... |
| 320e | FIELD 3 | 1..100 | 1,2,5,6,... |
| 320f | FIELD 3 | >100 | 3,4,... |
| 320g | RESULT FIELD 1 | 1 | 1,... |
| 320h | RESULT FIELD 1 | 2 | 2,... |
| | ... | | |

|     | ROW | COLUMN | VALUE ID |
|---|---|---|---|
| 345a | 1 | 1 (FIELD 1) | 1 |
| 345b | 1 | 2 (FIELD 2) | 2 |
| 345c | 1 | 3 (FIELD 3) | 3 |
| 345d | 1 | 4 (RESULT FIELD 1) | 4 |
| 345e | 2 | 1 (FIELD 1) | 1 |
| 345f | 2 | 2 (FIELD 2) | 5 |
| 345g | 2 | 3 (FIELD 3) | 3 |
| 345h | 2 | 4 (RESULT FIELD 1) | 6 |
| 345i | 3 | 1 (FIELD 1) | 1 |
| 345j | 3 | 2 (FIELD 2) | 2 |
| 345k | 3 | 3 (FIELD 3) | 7 |
| 345l | 3 | 4 (RESULT FIELD 1) | 8 |
| 345m | 4 | 1 (FIELD 1) | 1 |
| 345n | 4 | 2 (FIELD 2) | 5 |
|     | ... | ... | ... |

FIG. 3B 350
         355          360     ↙      370
          ↓            ↓             ↓
         | VALUE ID | VALUE  | CELL BUFFER |
365a →   | 1        | =A     | ( 1 )       |
365b →   | 2        | TRUE   | ( 2 )       |
365c →   | 3        | 1..100 | ( 3 )       |
365d →   | 4        | 1      | ( 4 )       |
365e →   | 5        | FALSE  | ( 5 )       |
365f →   | 6        | 2      | ( 6 )       |
365g →   | 7        | >100   | ( 7 )       |
365h →   | 8        | 3      | ( 8 )       |
         | ...      | ...    |             |

FIG. 3C

```
Cell_buffer type string

IF Field_1 = A.              cell_buffer(1) = x. Endif.
IF Field_2 = True.           cell_buffer(2) = x. ENDIF.
IF Field_3 >=1 and <= 100.   cell_buffer(3) = x. ENDIF.
IF cell_buffer(1-3) = X.
         Result_Field_1 = 1.
RETURN.
Endif.
IF Field_2 = False.          cell_buffer(4) = x. ENDIF.
IF cell_buffer(1,3,4) = X.
         Result_Field_1 = 2.
RETURN.
Endif.
IF Field_3 >100.             cell_buffer(5) = x. ENDIF.
IF cell_buffer(1,2,5) = X.
         Result_Field_1 = 3.
Endif.
IF cell_buffer(1,4,5) = X.
         Result_Field_1 = 4.
RETURN
Endif.
...
```

| INPUT1 | INPUT2 | OUTPUT |
|---|---|---|
| ABC | 123 | LINE 1 |
| ABC | 456 | LINE 2 |
| ABC | 789 | LINE 3 |
| DEF | 123 | LINE 4 |
| DEF | 456 | LINE 5 |
| DEF | 789 | LINE 6 |
|  |  | LINE 7 |

```
1 * Decision_table new generation
2 DATA lv_cell TYPE string.
3 CLEAR lv_cell.
4 * Row 1
5 DATA _v_value_s TYPE IF_FDT_TYPES=>ELEMENT_TEXT.
6 _v_value_s = `ABC`.
7 gv_comparison_test = INPUT1.
8 gv_comparison_val = _v_value_s.
9 translate gv_comparison_test to upper case.
10 IF gv_comparison_test EQ gv_comparison_val.
11 lv_cell(1) = abap_true.
12 ELSE.
13 lv_cell(1) = abap_false.
14 ENDIF.
15 DATA _v_value_s1 TYPE IF_FDT_TYPES=>ELEMENT_TEXT.
16 _v_value_s1 = `123`.
17 gv_comparison_test = INPUT2.
18 gv_comparison_val = _v_value_s1.
19 translate gv_comparison_test to upper case.
20 IF gv_comparison_test EQ gv_comparison_val.
21 lv_cell(2) = abap_true.
22 ELSE.
23 lv_cell(2) = abap_false.
24 ENDIF.
25 IF lv_cell(1) EQ ABAP_TRUE AND lv_cell(2) EQ ABAP_TRUE.
26 _v_temp_for_context = `Line 1`.
27 ENDIF.
28 * Row 2
29 DATA _v_value_s2 TYPE IF_FDT_TYPES=>ELEMENT_TEXT.
30 _v_value_s2 = `456`.
31 gv_comparison_test = INPUT2.
32 gv_comparison_val = _v_value_s2.
33 translate gv_comparison_test to upper case.
34 IF gv_comparison_test EQ gv_comparison_val.
35 lv_cell(3) = abap_true.
36 ELSE.
37 lv_cell(3) = abap_false.
38 ENDIF.
39 IF lv_cell(1) EQ ABAP_TRUE AND lv_cell(3) EQ ABAP_TRUE.
40 _v_temp_for_context = `Line 2`.
```

TO FIG. 6B

FROM FIG. 6A

FIG. 6B

```
41 ENDIF.
42 * Row 3
43 DATA _v_value_s3 TYPE IF_FDT_TYPES=>ELEMENT_TEXT.
44 _v_value_s3 = `789`.
45 gv_comparison_test = INPUT2.
46 gv_comparison_val = _v_value_s3.
47 translate gv_comparison_test to upper case.
48 IF gv_comparison_test EQ gv_comparison_val.
49 lv_cell(4) = abap_true.
50 ELSE.
51 lv_cell(4) = abap_false.
52 ENDIF.
53 IF lv_cell(1) EQ ABAP_TRUE AND lv_cell(4) EQ ABAP_TRUE.
54 _v_temp_for_context = `Line 3`.
55 ENDIF.
56 * Row 4
57 DATA _v_value_s4 TYPE IF_FDT_TYPES=>ELEMENT_TEXT.
58 _v_value_s4 = `DEF`.
59 gv_comparison_test = INPUT1.
60 gv_comparison_val = _v_value_s4.
61 translate gv_comparison_test to upper case.
62 IF gv_comparison_test EQ gv_comparison_val.
63 lv_cell(5) = abap_true.
64 ELSE.
65 lv_cell(5) = abap_false.
66 ENDIF.
67 IF lv_cell(5) EQ ABAP_TRUE AND lv_cell(2) EQ ABAP_TRUE.
68 _v_temp_for_context = `Line 4`.
69 ENDIF.
70 * Row 5
71 IF lv_cell(5) EQ ABAP_TRUE AND lv_cell(3) EQ ABAP_TRUE.
72 _v_temp_for_context = `Line 5`.
73 ENDIF.
74 * Row 6
75 IF lv_cell(5) EQ ABAP_TRUE AND lv_cell(4) EQ ABAP_TRUE.
76 _v_temp_for_context = `Line 6`.
77 ENDIF.
78 * Row 7
79 IF lv_cell(5) EQ ABAP_TRUE AND lv_cell(4) EQ ABAP_TRUE..
80 _v_temp_for_context = `Line 7`.
81 ENDIF.
```

OPTIMIZING SOURCE CODE

CLAIM OF PRIORITY

This application claims priority under 35 U.S.C. §119(e) to U.S. Provisional Patent Application Ser. No. 61/581,379, filed on Dec. 29, 2011, the entire contents of which are hereby incorporated by reference.

TECHNICAL BACKGROUND

This disclosure relates to optimizing source code.

BACKGROUND

Decision tables are often used in many business applications to, for example, derive a value, classify values or attributes, and/or map values or attributes. For example, a business enterprise may use a decision table in or with a business application to map customer attributes so that a customer group may be determined. Typically, a decision table includes one or more input fields and returns one or more outputs (or results) based on the input values. Performance of the execution of a decision table can be important; consequently code generation approaches are used. Fast execution of a decision table may be important, but so may be the number of lines of code which is generated based on the decision table. Minimizing the size of code to a minimum as the number of lines influences class loading time. Further, programming environments may have limits that need to be respected (e.g., limitations of number of literals used in a method, number of statements used, variables). Thus, minimizing source code lines may help meet the programming environment limits.

Conventional code generation techniques may either assume that a decision table for which code is to be generated is small (e.g., less than 100 lines) or limited in functionality (e.g., only mutually exclusive lines, only simple comparisons in a cell, only comparisons against values and not calculated values).

SUMMARY

In one general embodiment, techniques for optimizing code include methods, systems, and computer program products that implement operations including: identifying a decision table having values arranged in one or more cells in a row and column format, the values defining business rules; evaluating the decision table to generate one or more temporary tables, at least one temporary table including the values associated with particular positions of a string variable of undefined length; evaluating the one or more temporary tables to set the positions of the string variable based on comparisons of the values with inputs; and generating a portion of code defining the business rules based on the evaluation of the one or more temporary tables.

In a first aspect combinable with the general embodiment, the decision table includes one or more input fields and one or more result fields including the values.

In a second aspect combinable with any of the previous aspects, evaluating the decision table to generate one or more temporary tables includes generating a first temporary table including one or more field ID values comprising the one or more input fields and one or more result fields.

In a third aspect combinable with any of the previous aspects, the first temporary table further includes one or more value ID values including the values stored in the decision table.

In a fourth aspect combinable with any of the previous aspects, each value ID value corresponds with one of the one or more field ID values.

In a fifth aspect combinable with any of the previous aspects, evaluating the decision table to generate one or more temporary tables further includes evaluating the decision table to determine a portion of the values defined in a particular row of the decision table; and generating a second temporary table.

In a sixth aspect combinable with any of the previous aspects, the second temporary table includes one or more unique ID values.

In a seventh aspect combinable with any of the previous aspects, each unique ID value is associated in the second temporary table with a particular value defined in the particular row of the decision table.

In an eighth aspect combinable with any of the previous aspects, evaluating the decision table to generate one or more temporary tables further includes generating a third temporary table including the one or more unique ID values and one or more positions of the string variable; and associating, in the third temporary table, each of the one or more unique ID values stored in the second temporary table with a particular position of the positions of the string variable.

In a ninth aspect combinable with any of the previous aspects, generating a portion of code defining the business rules based on the evaluation of the one or more temporary tables includes evaluating at least one of the first, second, and third temporary tables to generate one or more conditional statements; and setting, by each conditional statement, at least one of the positions of the string variable to one of true or false.

In a tenth aspect combinable with any of the previous aspects, setting, by each conditional statement, at least one of the positions of the string variable to one of true or false includes comparing an input value stored in the at least one of the first, second, and third temporary tables to an associated result value; and setting a particular position of the string variable to true based on the input value equaling the associated result value or false based on the input value not equaling the associated result value.

An eleventh aspect combinable with any of the previous aspects includes storing at least one of the one or more temporary tables for more than a transient time duration.

Various embodiments of an optimizing engine according to the present disclosure may include one or more of the following features. For example, the optimizing engine may generate source code from a decision table that results in a much cleaner and more efficient code base. For instance, the optimizing engine may reduce a number of code lines by more than half as compared to conventional code generation techniques (e.g., code generated may be about 80 lines vs. 200 lines in conventional code generation techniques). In decision tables having cell repetition, the reduction can be even more dramatic (e.g., from >10,000 lines to about 1,500 lines). The optimizing engine may generate code for decision tables with any number of lines, complex cells, and/or dynamic comparison values. Thus, the optimizing engine may reduce the number of lines of code generated from a decision table while also improving runtime performance to generate the code from the decision table. The optimizing engine may also reduce the requirements for memory consumption and initial load times. The optimizing engine may also allow for much bigger decision tables (from 1000s of lines to 10,000s or even 100,000s of lines). As another example, the optimizing engine may implement swapping in a simplified way compared to high complexity of conventional techniques. As another example, the optimizing engine may implement a best match approach in the decision table (e.g., return the result that has passed most checks) better (e.g., result in faster performance of runtime and code generation, decrease in lines of code and complexity of generated code) than conventional techniques.

Various embodiments of an optimizing engine according to the present disclosure may also include one or more of the following features. For example, the optimizing engine may generate optimized code for mutual exclusive tables and non-mutually exclusive tables alike. Also, the optimizing engine may generate condition cell code exactly once for each possible value. The optimizing engine may also generate optimized code independent of column organization (in contrast to tree-like conventional optimization). Also, the optimizing engine may generate optimized code for a large decision table in increments (e.g., split into several swapping methods). The optimizing engine may also generate optimized code for decision tables in first and all match mode.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIG. 2 illustrates an example decision table;

FIGS. 3A-3C illustrate example tables and table variables generated during a code generation process based on the decision table shown in FIG. 2;

FIG. 4 illustrates an example algorithm for generating optimized source code based on at least a portion of the decision table shown in FIG. 2;

FIG. 5 illustrates another example decision table; and

FIGS. 6A-6B illustrate an example optimized source code based on at least a portion of the decision table shown in FIG. 5.

DETAILED DESCRIPTION

Figure 1:
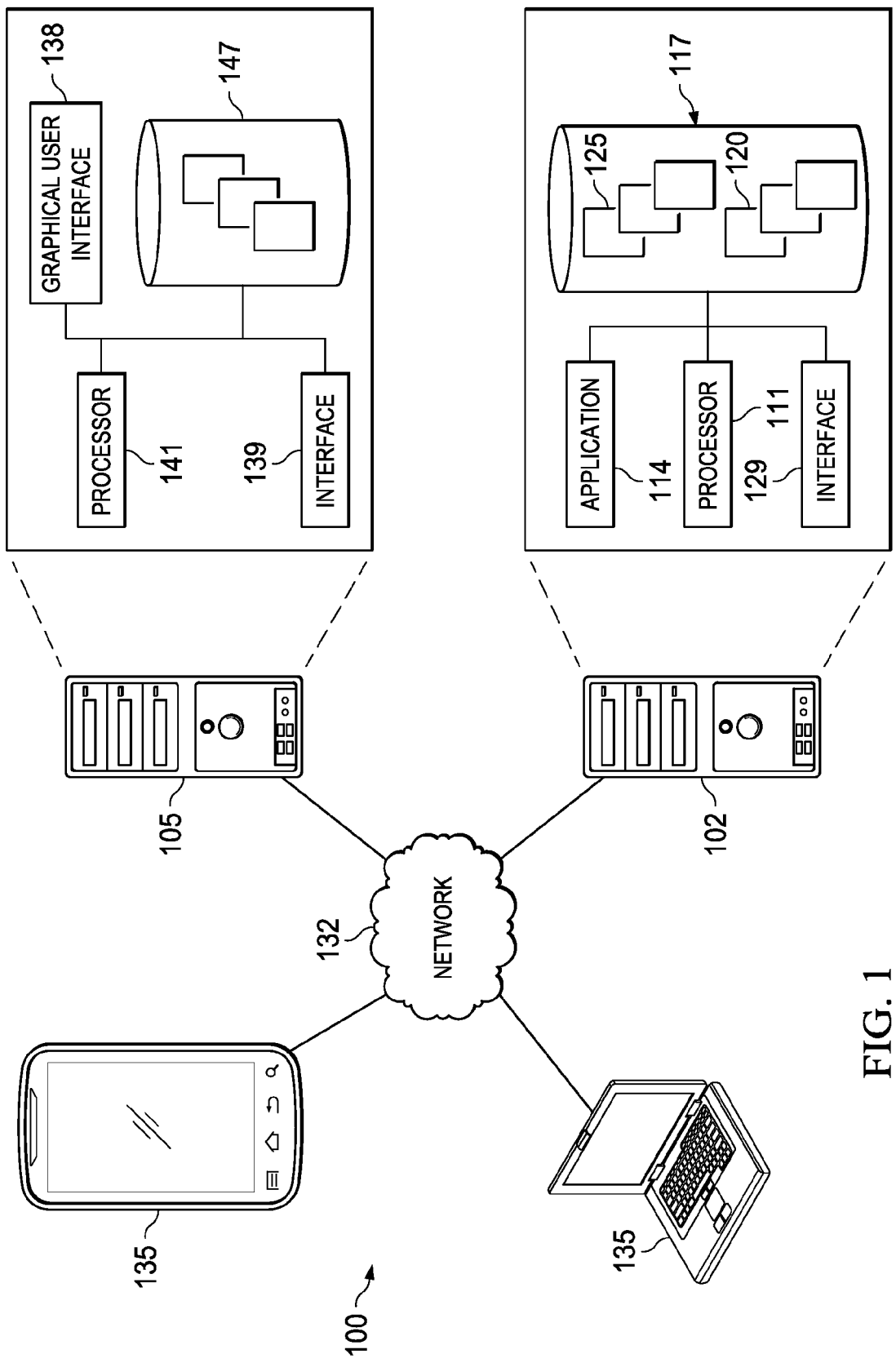
FIG. 1 illustrates an example distributed computing system operable to optimize source code according to the present disclosure.

The present disclosure describes an optimizing engine that can generate source code reflecting one or more rules decisions stored in a decision table. For example, in some embodiments, the optimizing engine may generate one or more temporary tables that may associate result variables associated with input fields with particular positions of a string variable. Once each position of the string variable (e.g., an undefined length string variable) is set, further evaluation or comparison of the particular input fields to determine if they match the result variables may be unnecessary, thereby making generation of code based on the rules decisions more efficient.

FIG. 1 illustrates an example distributed computing system 100 operable to optimize source code according to the present disclosure. In some embodiments, system 100 includes an optimizing engine 114 ("application 114") that traverses a decision table and generates code (e.g., source code) based on the input fields and output fields of the decision table. The illustrated environment 100 includes or is communicably coupled with an enterprise server 102, a host server 105, and one or more clients 135, at least some of which communicate across network 132. In general, environment 100 depicts an example configuration of a system capable of providing stateful execution of stateless applications in a substantially transparent way, as well as dynamically determining the particular application's mode of operation in response to requests from its clients 135.

In general, the enterprise server 102 is a server that stores the optimizing engine 114, where at least a portion of the optimizing engine 114 is executed via requests and responses sent to users or clients within and communicably coupled to the illustrated environment 100 of FIG. 1. In some instances, the enterprise server 102 may store a plurality of various optimizing engines 114, while in other instances, the enterprise server 102 may be a dedicated server meant to store and execute only a single optimizing engine 114. In some instances, the enterprise server 102 may include a web server, where the optimizing engines 114 represent one or more web-based applications accessed and executed via network 132 by the clients 135 of the system to perform the programmed tasks or operations of the optimizing engine 114.

At a high level, the enterprise server 102 includes an electronic computing device operable to receive, transmit, process, store, or manage data and information associated with the environment 100. Specifically, the enterprise server 102 illustrated in FIG. 1 is responsible for receiving application requests from one or more client applications associated with the clients 135 of environment 100 and responding to the received requests by processing said requests in the associated optimizing engine 114, and sending the appropriate response from the optimizing engine 114 back to the requesting client application. In addition to requests from the external clients 135 illustrated in FIG. 1, requests associated with the optimizing engines 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single enterprise server 102, environment 100 can be implemented using two or more servers 102, as well as computers other than servers, including a server pool. Indeed, enterprise server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated enterprise server 102 may be adapted to execute any operating system, including Linux, UNIX, Windows, Mac OS, or any other suitable operating system.

In the present implementation, and as shown in FIG. 1, the enterprise server 102 includes a processor 111, an interface 129, a memory 117, and one or more optimizing engines 114. The interface 129 is used by the enterprise server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the enterprise server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet.

In some instances, a portion of the network 132 may be a virtual private network (VPN), such as, for example, the connection between the clients 135 and the enterprise server 102. Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, subnetwork, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, enterprise server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of enterprise server 102 and, specifically, the one or more plurality of optimizing engines 114. Specifically, the server's processor 111 executes the functionality required to receive and respond to requests from the clients 135 and their respective client applications, as well as the functionality required to perform the other operations of the optimizing engine 114.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of submodules, third party services, components, libraries, and such, as appropriate. Conversely, the features and functionality of various components can be combined into single components as appropriate. In the illustrated environment 100, processor 111 executes one or more optimizing engines 114 on the enterprise server 102.

At a high level, each of the one or more optimizing engines 114 is any application, program, module, process, or other software that may execute, change, delete, generate, or otherwise manage information according to the present disclosure, particularly in response to and in connection with one or more requests received from the illustrated clients 135 and their associated client applications. In certain cases, only one optimizing engine 114 may be located at a particular enterprise server 102. In others, a plurality of related and/or unrelated optimizing engines 114 may be stored at a single enterprise server 102, or located across a plurality of other servers 102, as well.

In certain cases, environment 100 may implement a composite optimizing engine 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the optimizing engines 114 may represent web-based applications accessed and executed by remote clients 135 or client applications via the network 132 (e.g., through the Internet). Further, while illustrated as internal to enterprise server 102, one or more processes associated with a particular optimizing engine 114 may be stored, referenced, or executed remotely. For example, a portion of a particular optimizing engine 114 may be a web service associated with the application that is remotely called, while another portion of the optimizing engine 114 may be an interface object or agent bundled for processing at a remote client 135. Moreover, any or all of the optimizing engines 114 may be a child or sub-module of another software module or enterprise application (not illustrated) without departing from the scope of this disclosure. Still further, portions of the optimizing engine 114 may be executed by a user working directly at enterprise server 102, as well as remotely at client 135.

The enterprise server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise server 102 and its one or more optimizing engines 114. Additionally, memory 117 may include any other appropriate data, such as VPN applications, firmware logs and policies, firewall policies, a security or access log, print or other reporting files, as well as others.

As illustrated, the memory 117 stores one or more decisions tables 120 (e.g., as shown in FIGS. 2 and 5) and one or more tables 125 (e.g., as shown in FIGS. 3A-3C). In some embodiments, the tables 125 may be generated, for example, by the optimizing engine 114 during the code generation process and only stored temporarily (e.g., during the process). The tables 125 may then be deleted once the code is generated by the optimizing engine 114. In some embodiments, the tables 125 include tabular variables in memory (e.g., memory 117) of the methods/procedures in the optimizing engine 114 that generates the code of the decision tables 120.

The illustrated environment 100 also includes the hosted server 105, which includes one or more processors 141, an interface 139, a memory 147, and a graphical user interface (GUI) 138. The one or more processors 141, the interface 139, and the memory 147 may be substantially similar to those same components described above with reference to the enterprise server 102. In some embodiments, the hosted server 105 may execute all or a portion of the optimizing engine 114 separate from, or in cooperation with, the enterprise server 102.

The illustrated GUI 138 is a graphical user interface operable to interface with at least a portion of environment 100 for any suitable purpose, including generating a visual representation of the optimizing engine 114, a client application (in some instances, the client's web browser) and the interactions with the optimizing engine 114, including the responses received from the optimizing engine 114 received in response to the requests sent by the client application. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user. In general, the GUI 138 may include a plurality of user interface (UI) elements, some or all associated with the client application, such as interactive fields, pull-down lists, and buttons operable by the user at client 135.

These and other UI elements may be related to or represent the functions of the client application, as well as other software applications executing at the client 135. In particular, the GUI 138 may be used to present the client-based perspective of the optimizing engine 114, and may be used (as a web browser or using the client application as a web browser) to view and navigate the optimizing engine 114, as well as various web pages located both internal and external to the server, some of which may be associated with the optimizing engine 114. For purposes of the present location, the GUI 138 may be a part of or the entirety of the client application, while also merely a tool for displaying the visual representation of the client and optimizing engines' 114 actions and interactions. In some instances, the GUI 138 and the client application may be used interchangeably, particularly when the client application represents a web browser associated with the optimizing engine 114.

The illustrated environment of FIG. 1 also includes one or more clients 135. Each client 135 may be any computing device operable to connect to or communicate with at least the enterprise server 102 and/or via the network 132 using a wireline or wireless connection. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the enterprise server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, tablet, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the enterprise server 102 (and optimizing engine 114) or the client 135 itself, including digital data, visual information, or a client application. Both the input and output device may include fixed or removable storage media such as a magnetic storage media, CD-ROM, or other suitable media to both receive input from and provide output to users of the clients 135 through a display.

Each client, typically, is an electronic computing device that includes a processor, an interface, a graphical user interface (GUI), a client application, and a memory. Such components may be similar to those described above with reference to the enterprise server 102 and/or hosted server 105.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIG. 2 illustrates an example decision table 200. In some embodiments, the decision table 200 may be one of the decision tables 120. Generally, the decision table 200 may graphically describe a set of rules (e.g., business rules) used by one or more business applications for a business enterprise. In other words, decision table 200 may graphically describe business rules without a full textual explanation of the rules (e.g., if/then conditional text statements). The illustrated decision table 200 includes a number of input fields 205a, 205b, and 205c with values in columnar format. The illustrated decision table 200 also includes a result field 210. Although only three input fields 205a, 205b, and 205c are illustrated, the decision table 200 may include any number of input fields (e.g., tens, hundreds, or even thousands) as well as any number of result fields. Further, the decision table 200 may be one of tens, hundreds, or even thousands of decision tables used by an enterprise, for example, in implementing business rules.

The values for the input fields 205a, 205b, and 205c are stored in rows 215a through 215f of the decision table 200, as illustrated. In other words, the input fields (e.g., 205a through 205c) may be compared against the values in the rows (e.g., 215a through 215f) in the table 200. The values may be alphanumeric or Boolean values, including ranges or expressions, as well as text comparisons, date/time comparisons, or other value determination. As one example of a textual determination, an input field may determine that a customer name starts with "ABC." For example, as illustrated, input field 205a may be constrained to a value set to A or B, while the input field 205b may be constrained to a value set to True or False. The input value 205c may be constrained to a numeric range (e.g., 1 to 100, >100, or other examples).

In some embodiments, an optimizing engine, such as the optimizing engine 114, may translate the decision table 200 to generate or build source code that implements the rules in the decision table 200. The generated code may then be executed, for example, by a business application to ensure that the rules of the decision table 200 are being met by the business enterprise.

As illustrated, decision table 200 includes six rows 215a through 215f. However, in alternative embodiments, the decision table 200 (and indeed any decision table) may include tens, hundreds, or even thousands of rows. Each row of the decision table 200 may represent a particular business rule implemented in an if/then conditional statement. For example, row 215a may be interpreted as "if input field 205a equals A, and if input field 205b equals True, and if input field 205c is between 1 and 100, then the result field 210 is set to 1." Likewise, row 215b may be interpreted as "if input field 205a equals A, and if input field 205b equals False, and if input field 205c is between 1 and 100, then the result field 210 is set to 2." Likewise, row 215c may be interpreted as "if input field 205a equals A, and if input field 205b equals True, and if input field 205c is greater than 100, then the result field 210 is set to 3," and so on.

An "else" statement is implied at the end of each row 2215a through 215f. For example, should any particular one of the input fields 205a, 205b, or 205c not meet the specified condition, then attention is directed to the next row. For example, should one of the conditions in row 215a not be met (i.e., input field 205a does not equal A, or input field 205b does not equal True, or input field 205c is not between 1 and 100), then the next row 215b is evaluated. In some embodiments, the evaluation of each row 215a through 215f is implemented by a "do" loop. For example, one conventional pseudo-code algorithm generated for rows 215a through 215d of decision table 200 is as follows:

```
IF (Input Field 205a = A) AND (Input Field 205b = True) AND (Input
    Field 205c >=1 AND <=100) THEN Result Field 210 = 1)
ENDIF.
IF (Input Field 205a = A) AND (Input Field 205b = False) AND (Input
    Field 205c >=1 AND <=100) THEN Result Field 210 = 2)
ENDIF.
IF (Input Field 205a = A) AND (Input Field 205b = True) AND (Input
    Field 205c >100) THEN Result Field 210 = 3)
ENDIF.
IF (Input Field 205a = A) AND (Input Field 205b = False) AND (Input
    Field 205c >100) THEN Result Field 210 = 4)
ENDIF.
```

Although the generated pseudo-code may accurately define these rows of the decision table 200, there may be many redundant evaluations, resulting in bloated code and loss of performance (e.g., in generating the code and executing the generated code).

In a conventional optimization technique (e.g., a tree-like code), a pseudo-code algorithm generated for rows 215a through 215d of decision table 200 is as follows:

```
IF ( Input Field 205a = A )
    IF (Input Field 205b = True ) AND (Input Field 205c >= 1 AND
        <= 100 ) THEN Result Field 210 = 1
    ENDIF.
    IF (Input Field 205b = False ) AND (Input Field 205c >= 1 AND
        <= 100 ) THEN Result Field 210 = 2
    ENDIF.
    IF (Input Field 205b = True ) AND (Input Field 205c >100 ) THEN
        Result Field 210 = 3
    ENDIF.
    IF (Input Field 205b = false ) AND (Input Field 205c >100 )
        THEN Result Field 210 = 4
    ENDIF.
ENDIF.
```

Although this example conventional optimization technique may result in an optimized source code generated from the decision table 200 (e.g., faster generation), such techniques may only work when the decision table is organized in a particular manner. For instance, such techniques may work for mutually exclusive decision tables (e.g., decision tables with well-defined lists of possible values for each input field column with rows that do not overlap) but not for non-mutually exclusive decision tables. For instance, in mutually exclusive decision tables, row sequence does not matter and therefore the code can be generated in any sequence. But in non-mutually exclusive decision tables, the row sequence does matter and therefore the table cannot be reorganized to optimize performance in generated code.

The optimizing engine 114 may generate code (e.g., productive code) implementing the decision table 200 in a more optimized fashion as compared to the above-described conventional techniques. For example, in some embodiments, the optimizing engine 114 may, after calling a method to generate the code, temporarily generate (and, in some cases store) one or more tables (shown in FIGS. 3A-3C). The optimizing engine 114 then loops over one or more of the tables (300, 325, and 350) to generate the code using a string variable of undefined length of characters to write values that represent results of the comparisons (i.e., decisions) defined in the decision table.

FIGS. 3A-3C illustrate example tables 300, 325, and 350, respectively, generated based on the decision table 200 shown in FIG. 2. In this example, the tables 300, 325, and 350 are generated by the optimizing engine 114 (e.g., in the order of table 300, then 325, then 350) to generate code implementing the rules decisions of the decision table 200.

Turning first to FIG. 3A, the optimizing engine 114 generates the illustrated table 300, which includes a field ID column 305, a value ID column 310, and a row ID column 315. The field ID column 305 is generated by the optimizing engine 114 by reading the data in the decision table 200 and determining a maximum number of possible values for each input field and each result field in the decision table 200. A row 320a through 320h is generated for each of the possible values for each input field and each result field. Here, as illustrated, Field 1 (input field 205a) has two possible values, A or B, and thus two rows (320a and 320b) are generated corresponding to Field 1 (input field 205a). The possible values (A or B) are placed in the value ID column 310 for the corresponding rows for Field 1. Also, the row ID column 315 is generated, which identifies the particular rows in the decision table 200 (i.e., rows 215a through 215f) in which the corresponding value of Field 1 may be found. Here, as illustrated, value A for Field 1 (input field 205a) is found in rows 1, 2, 3, and 4 (row 215a, row 215b, row 215c, and row 215d) and possibly others (not shown). Value B for Field 1 (input field 205a) is found in rows 5 and 6 (row 215e and row 215f) and possibly others (not shown).

Likewise, as illustrated, Field 2 (input field 205b) has two possible values, True or False, and thus two rows (320c and 320d) are generated corresponding to Field 2 (input field 205b). The possible values (True or False) are placed in the value ID column 310 for the corresponding rows for Field 2. Also, the row ID column 315 is generated, which identifies the particular rows in the decision table 200 (i.e., rows 215a through 215f) in which the corresponding value of Field 2 may be found. Here, as illustrated, value True for Field 2 (input field 205b) is found in rows 1, 3, and 5 (row 215a, row 215c, and row 215e) and possibly others (not shown). Value False for Field 2 (input field 205b) is found in rows 2, 4, and 6 (row 215b, row 215d, and row 215f) and possibly others (not shown). Likewise, rows 320e and 320f can be generated for Field 3 (input field 205c) while rows 320g and 320h can be generated for the result fields 210.

Turning next to FIG. 3B, the optimizing engine 114 generates the illustrated table 325 from the table 300 and the decision table 200. The table 325 includes a row ID column 330, a column ID column 335, and a value ID column 340. In some embodiments, the optimizing engine 114 builds the table 325 with the following process. First, the optimizing engine 114 identifies all of the possible values in a row of the decision table 200. Here, since there are three input fields (205a through 205c) and one result field (210), there are four values for a row of the decision table 200. The optimizing engine 114 then generates four rows (345a through 345d) in the table 325 and identifies row 1 (215a) in each place of the row ID column 330. In the column ID column 335, the four possible values—Field 1 (input field 205a), Field 2 (input field 205b), Field 3 (input field 205c), and Result Field 1 (result field 210)—for row 1 are inserted. Then, a representative value for each particular cell of the decision table 200 that corresponds to the row/column combination (i.e., combination of row ID column 330 and column ID column 335) that is unique (e.g., not found previously in the decision table 200) is placed in the value ID column. For example, as shown, the representative values start at 1 and continue until each unique value is accounted for.

Continuing this example, the optimizing engine 114 then generates four rows (345e through 345h) in the table 325 and identifies row 2 (215b) in each place of the row ID column 330. In the column ID column 335, the four possible values— Field 1 (input field 205a), Field 2 (input field 205b), Field 3 (input field 205c), and Result Field 1 (result field 210)—for row 2 are inserted. Then, a representative value for each particular cell of the decision table 200 that corresponds to the row/column combination (i.e., combination of row ID column 330 and column ID column 335) that is unique (e.g., not found previously in the decision table 200) is placed in the value ID column.

Turning now to FIG. 3C, the optimizing engine 114 then generates the illustrated table 350 from the tables 300 and 325 and the decision table 200. The illustrated table 350 associates the representative values of the value ID column 340 (also 355) with a corresponding value found in the particular cell of the decision table 200 that corresponds to the row/column combination (i.e., combination of row ID column 330 and column ID column 335) that is unique. For example, as illustrated, the representative value "1" shown in row 365a of the table 350 is "A." The representative value "2" shown in row 365b is "True," and so on. Accordingly, each value in the value ID column 355 has a unique value associated with it from the decision table 200.

The table 350 also includes a cell buffer column 370, which indicates, for each value, whether a particular position in a string (i.e., the cell buffer) has been previously set, i.e., has a pointer already been set in the (x) position of the string to the value shown in the value ID column 360.

Once the tables 300, 325, and 350 have been generated, then the optimizing engine 114 may loop over the tables 325 and 350 to generate the code implementing the rules decisions in the decision table 200. By generating the string variable with positions assigned by the cell buffer column 370, several determinations may be skipped when generating the code, thereby optimizing (e.g., producing less lines and generating the code faster) the code generated for implementing the rules decisions of the decision table 200.

FIG. 4 illustrates an example pseudo-code algorithm 400 for generating optimized source code based on at least a portion of the decision table 200 shown in FIG. 2, using one or more of the tables 300, 325, and 350. As illustrated, the pseudo-code algorithm 400 illustrates the generated code based on the first four rows of the decision table 200. Such pseudo-code algorithm 400 may be representative of the code generated when the optimizing engine 114 loops over the tables 325 and 350. As illustrated, for example, the optimizing engine 114 first loops over the first row identified in the decision table 200 (row 215a) with the first three IF statements and sets the cell buffer values at each position corresponding to the column values (e.g., input field 205a, input field 205b, and input field 205c) as "true" (represented by the x) if all of the values in these fields are true. Thus, these cell buffer value positions (e.g., positions (1), (2), and (3)) are set to true. An additional IF statement sets the result field 210 in the first row as "1" when the cell buffer values at these three positions are set to true.

Next, the optimizing engine 114 need only determine, in the next IF statement, whether Field 2 (input field 205b) is False to set the next cell buffer position, in this case (4), to true. Thus, by determining, in the next IF statement, whether the cell buffer positions at (1), (3), and (4) are set to true, the result field 210 from the second row is set to "2." Note that, here, evaluations for the cell buffer positions (1) and (3) were already completed and set, thereby eliminating the need to perform these evaluations again.

Next, the optimizing engine 114 need only determine, in the next IF statement, whether Field 3 (input field 205c) is greater than 100 to set the next cell buffer position, in this case (5), to true. Thus, by determining, in the next IF statement, whether the cell buffer positions at (1), (2), and (5) are set to true, the result field 210 from the third row is set to "3." Note that, here, evaluations for the cell buffer positions (1) and (2) were already completed and set, thereby eliminating the need to perform these evaluations again. This process continues to loop over the completed tables 325 and 350.

Next, the optimizing engine 114 need only evaluate, in the next IF statement, whether the cell buffer positions at (1), (4), and (5) are set to true. Is so, then the result field 210 from the fourth row is set to "4." Note that, here, evaluations for the cell buffer positions (1), (4) and (5) were already completed and set, thereby eliminating the need to perform these evaluations again. This process continues to loop over the completed tables 325 and 350.

FIG. 5 illustrates another example decision table 500. Here, there are two input fields, input field 505a and input field 505b. There is also an output field 510 in the illustrated decision table 500. As illustrated, there are six rows 515a through 515f in the decision table 500. Rows 515a through 515c have input values of "ABC" for input field 505a and input values of "123," "456," and "789" for input field 505b, respectively. Rows 515d through 515f have input values of "DEF" for input field 505a and input values of "123," "456," and "789" for input field 505b, respectively.

Turning now to FIGS. 6A-6B, an example generated code 600 illustrated that is developed by the optimizing engine 114 based on at least a portion of the decision table 500 shown in FIG. 5. As illustrated, line 2 defines an lv_string as a string type variable—this is the string variable of undefined length of characters to write values that represent a results of the comparisons (i.e., decisions) defined in the decision table. The generated code 600 is an example portion of output from the optimizing engine 114 and, as such, may not show each and every line of code of the output. For instance, generated code 600 may include a "RETURN" statement after each line of code (e.g., lines 26, 40, 54, 68, 72, 76, 80) in which the variable _v_temp_for_context is assigned a value.

In this example, lines 4-27 represent the code generated in evaluating the first row (515a) of decision table 500 based on one or more tables (not shown) generated by the optimizing engine 114. Lines 5-9 are preparation code lines. For example, lines 5-9 may prepare certain variables, such as assign table values to variables, convert upper case to lower case, and other preparation step not affected by the optimizing process performed by the optimizing engine 114.

Lines 10-14 represent the code generated in evaluating the first row/first column of the decision table 500 (i.e., row 515a and input field 505a). The first position, (1), of lv_string is set to true if the value is "ABC" and false otherwise.

Lines 15-19 are additional preparation code lines for the next evaluation. Again, lines 15-19 may prepare certain variables, such as assign table values to variables, convert upper case to lower case, and other preparation step not affected by the optimizing process performed by the optimizing engine 114.

Lines 20-24 represent the code generated in evaluating the first row/second column of the decision table 500 (i.e., row 515a and input field 505b). The second position, (2), of lv_string is set to true if the value is "123" and false otherwise.

Finally, lines 25-27 represent the code generated in evaluating the first row/third column. Here, a simple IF statement determines whether both positions (1) and (2) of lv_string are set to true, and, if so, the output value is set to "Line 1."

Continuing with FIG. 5, lines 28-41 represent the code generated in evaluating the second row (515b) of decision table 500 based on one or more tables (not shown) generated by the optimizing engine 114. Note, however, that previously set positions of lv_string are used again and not reevaluated, thus resulting in an optimized code generation. For example, after preparation code and code for evaluating whether position (3) of lv_string is set to true, an IF statement evaluates whether both positions (1) and (3) are true, without reevaluating position (1) (which is already set). If both are set to true, then the output value is set to "Line 2." Such shortened code for rows 3 and 4 are shown in lines 42-55 and lines 56-69, respectively, which illustrate the reuse of set positions of lv_string.

Rows 5, 6, and 7 are evaluated with even shorter code statements, since all of the lv_string positions ((1) through (5)) have been set to true or false. Thus, the evaluation of row 5 simply occurs by an IF statement that sets the output value to "Line 5" if lv_string(5) (e.g., for row 515d, input field 505a) is set to true and lv_string(3) (e.g., for row 515b, input field 505b) is set to true. Likewise, the evaluation of row 6 simply occurs by an IF statement that sets the output value to "Line 6" if lv_string(5) is set to true and lv_string(4) (e.g., for row 515c, input field 505b) is set to true.

Although this disclosure has been described in terms of certain embodiments and generally associated methods, alterations and permutations of these embodiments and methods will be apparent to those skilled in the art. For example, Accordingly, the above description of example embodiments does not define or constrain this disclosure. Other changes, substitutions, and alterations are also possible without departing from the spirit and scope of this disclosure.

What is claimed is:

1. A computer-implemented method for optimizing code, the method comprising:
identifying a decision table that comprises one or more input fields and one or more result fields, the one or more input fields and one or more result fields comprising values arranged in one or more cells in a row and column format, the values defining business rules;
evaluating the decision table to generate a plurality of temporary tables, the generating including:
generating a first temporary table including:
determining a maximum number of possible values for each of the one or more input fields and each of the one or more result fields in the decision table,
generating a row for each possible value of the maximum number of possible values, each row comprising a field ID value associated with one of the one or more input fields and one or more result fields of the decision table, and a value ID value comprising the corresponding value of the field ID value stored in the decision table;
generating a second temporary table including:
identifying one or more unique values based on a combination of a particular row and a particular column of the decision table,
for each unique value of the decision table, associating a unique ID value with the corresponding combination of the particular row and the particular column, the second temporary table comprising one or more unique ID values;
generating a third temporary table including:
for each unique ID value of the second temporary table, associating the unique ID value with the corresponding value of the associated combination of the particular row and the particular column of the decision table,
associating each corresponding value with a particular position of a string variable, the third temporary table comprising one or more associations with particular positions of the string variable;
evaluating the second and the third temporary tables to set the positions of the string variable based on comparisons of the values with inputs; and
generating a portion of code defining the business rules based on the evaluation of the second and the third temporary tables.

2. The method of claim 1, wherein generating a portion of code defining the business rules based on the evaluation of the plurality of temporary tables comprises:
evaluating at least one of the first, second, and third temporary tables to generate one or more conditional statements; and
setting, by each conditional statement, at least one of the positions of the string variable to one of true or false.

3. The method of claim 2, wherein setting, by each conditional statement, at least one of the positions of the string variable to one of true or false comprises:

comparing an input value stored in the at least one of the first, second, and third temporary tables to an associated result value; and setting a particular position of the string variable to true based on the input value equaling the associated result value or false based on the input value not equaling the associated result value.

4. The method of claim 1, further comprising:
storing at least one of the plurality of temporary tables for more than a transient time duration.

5. A system of one or more computers configured to perform operations comprising:
identifying a decision table that comprises one or more input fields and one or more result fields, the one or more input fields and one or more result fields comprising values arranged in one or more cells in a row and column format, the values defining business rules;
evaluating the decision table to generate a plurality of temporary tables, the generating including:
generating a first temporary table including:
determining a maximum number of possible values for each of the one or more input fields and each of the one or more result fields in the decision table,
generating a row for each possible value of the maximum number of possible values, each row comprising a field ID value associated with one of the one or more input fields and one or more result fields of the decision table, and a value ID value comprising the corresponding value of the field ID value stored in the decision table;
generating a second temporary table including:
identifying one or more unique values based on a combination of a particular row and a particular column of the decision table,
for each unique value of the decision table, associating a unique ID value with the corresponding combination of the particular row and the particular column, the second temporary table comprising one or more unique ID values;
generating a third temporary table including:
for each unique ID value of the second temporary table, associating the unique ID value with the corresponding value of the associated combination of the particular row and the particular column of the decision table,
associating each corresponding value with a particular position of a string variable, the third temporary table comprising one or more associations with particular positions of the string variable;
evaluating the second and the third temporary tables to set the positions of the string variable based on comparisons of the values with inputs; and
generating a portion of code defining the business rules based on the evaluation of the second and the third temporary tables.

6. The system of claim 5, wherein generating a portion of code defining the business rules based on the evaluation of the plurality of temporary tables comprises:
evaluating at least one of the first, second, and third temporary tables to generate one or more conditional statements; and
setting, by each conditional statement, at least one of the positions of the string variable to one of true or false.

7. The system of claim 6, wherein setting, by each conditional statement, at least one of the positions of the string variable to one of true or false comprises:

comparing an input value stored in the at least one of the first, second, and third temporary tables to an associated result value; and setting a particular position of the string variable to true based on the input value equaling the associated result value or false based on the input value not equaling the associated result value.

8. The system of claim 5, wherein the operations further comprise:
storing at least one of the plurality of temporary tables for more than a transient time duration.

9. A non-transitory computer storage medium encoded with a computer program, the program comprising instructions that when executed by one or more computers cause the one or more computers to perform operations comprising:
identifying a decision table that comprises one or more input fields and one or more result fields, the one or more input fields and one or more result fields comprising values arranged in one or more cells in a row and column format, the values defining business rules;
evaluating the decision table to generate a plurality of temporary tables, the generating including:
generating a first temporary table including:
determining a maximum number of possible values for each of the one or more input fields and each of the one or more result fields in the decision table,
generating a row for each possible value of the maximum number of possible values, each row comprising a field ID value associated with one of the one or more input fields and one or more result fields of the decision table, and a value ID value comprising the corresponding value of the field ID value stored in the decision table;
generating a second temporary table including:
identifying one or more unique values based on a combination of a particular row and a particular column of the decision table,
for each unique value of the decision table, associating a unique ID value with the corresponding combination of the particular row and the particular column, the second temporary table comprising one or more unique ID values;
generating a third temporary table including:
for each unique ID value of the second temporary table, associating the unique ID value with the corresponding value of the associated combination of the particular row and the particular column of the decision table,
associating each corresponding value with a particular position of a string variable, the third temporary table comprising one or more associations with particular positions of the string variable;
evaluating the second and the third temporary tables to set the positions of the string variable based on comparisons of the values with inputs; and
generating a portion of code defining the business rules based on the evaluation of the second and the third temporary tables.

10. The non-transitory computer storage medium of claim 9, wherein generating a portion of code defining the business rules based on the evaluation of the plurality of temporary tables comprises:
evaluating at least one of the first, second, and third temporary tables to generate one or more conditional statements; and
setting, by each conditional statement, at least one of the positions of the string variable to one of true or false.

11. The non-transitory computer storage medium of claim 10, wherein setting, by each conditional statement, at least one of the positions of the string variable to one of true or false comprises:
- comparing an input value stored in the at least one of the first, second, and third temporary tables to an associated result value; and
- setting a particular position of the string variable to true based on the input value equaling the associated result value or false based on the input value not equaling the associated result value.

12. The non-transitory computer storage medium of claim 9, wherein the operations further comprise:
- storing at least one of the plurality of temporary tables for more than a transient time duration.

* * * * *